(12) United States Patent
Borosh

(10) Patent No.: US 6,756,983 B1
(45) Date of Patent: Jun. 29, 2004

(54) METHOD OF VISUALIZING DATA

(75) Inventor: Joseph T. Borosh, Lawrenceville, GA (US)

(73) Assignee: BellSouth Intellectual Property Corporation, Wilmington, DE (US)

( * ) Notice: Subject to any disclaimer, the term of this patent is extended or adjusted under 35 U.S.C. 154(b) by 274 days.

(21) Appl. No.: 09/885,010

(22) Filed: Jun. 21, 2001

(51) Int. Cl.[7] .............................................. G06T 11/20
(52) U.S. Cl. ....................... 345/440; 345/473; 345/970; 345/970.1; 434/81; 434/107; 434/430; 705/7
(58) Field of Search ................................. 345/440, 949, 345/970, 970.1; 434/81, 107, 430; 705/8–11, 7, 1

(56) References Cited

U.S. PATENT DOCUMENTS 6,232,984 B1 * 5/2001 Chuah et al. ............... 345/441

2002/0035502 A1 * 3/2002 Raza ........................... 705/10
2002/0126121 A1 * 9/2002 Robbins ...................... 345/440

OTHER PUBLICATIONS

M. Brooks, "Understanding Visualization," INDX Software Corporation (white paper) (1999).

* cited by examiner

Primary Examiner—Matthew C. Bella
Assistant Examiner—Antonio Caschera
(74) Attorney, Agent, or Firm—Shaw Pittman LLP

(57) ABSTRACT

A method of visualizing data including displaying wheels, which represent functional units of a system, wherein each wheel is subdivided into segments collectively representing a process within the functional unit, identifying at least one communications pathway, connecting a hub of each of the wheels to the communications pathway, rotating the wheels around the communication pathway, periodically noting rotational positions of the plurality of wheels, and correlating the rotational positions with the timing of information that is transmitted via the communications pathway as the information passes one or more of the wheels.

30 Claims, 3 Drawing Sheets

METHOD OF VISUALIZING DATA

BACKGROUND

Field of the Invention

The present invention is directed to a method of visualizing data. More particularly, the present invention is directed to a data visualization scheme that enables a more clear understanding of the monitoring, analysis and prediction of effects of internal and external events that occur inside and outside of a system.

BACKGROUND OF THE INVENTION

The analysis of business processes to find and promote efficiencies is an important function in any enterprise. One way to undertake such an analysis is to "dissect" business processes, organizations and the roles of personnel. For example, a typical business might include a sales force, a marketing group, technical support personnel, infrastructure, etc., all of which, in a perfect world, should be analyzed on an on-going basis. Many methods have been developed to extract information from people and to try to assemble analytic information so that it makes sense to an analyzer (a person), whereby it is possible to constitute a solution to a problem. Such methods are often designed to detect trends or patterns around the type of collection that, presumably, can help reach answers to problems or identify inefficiencies very quickly. Usually, one tries to develop ways, techniques and methodologies to be able to gather information quickly, identify, for example, ten or fifteen key points that are believed to be important, and based on those points, quickly form and suggest a solution or recommendation.

Early methodologies for gathering information tended to be "tactical." That is to say, tactical, or pointed, questions were posed to personnel such as, "what is the current problem?" or "what do you think you need to do?" The answers to such questions, however, tend not to provide the information that is really being sought since many business people tend not to think about their environment; they instead tend to think only about their particular job. Accordingly, even though an analysis has been attempted, tactical questions tend not to be useful and the resulting answers are also often equally unuseful. Thus, the "right" solution or recommendation is rarely identified because one never really collects enough, or the proper, information on which to base such solutions or recommendations.

Recognizing the deficiencies in prior art methodologies, those skilled in the art have developed ways of trying to create a generalized knowledge base that is designed to help understand where a business is in its lifecycle, where it fits in its environment and what problems it may be having. The particular problem being addressed using this knowledge base could be a communications problems or it could be a problem with purchasing or manufacturing a widget. What the "problem" is is not critical. Instead, the process of data gathering and analysis is what is important.

As an example, steps for analyzing "selling" might include: identifying an infrastructure, an operation and a business element. Infrastructure is what runs the business, operation includes the processes within the business, and the business element is what is driving the business, e.g., what the business financials are. From the information obtained, one can extract relevant information that reveals particular aspects and characteristics of the business from which it is possible to begin pinpointing problems and to begin generating a solution.

This type of methodology accumulates knowledge and works well when one company is being analyzed. However, this type of analysis becomes problematic when hundreds or even thousands of companies are analyzed. Specifically, one quickly gets overloaded with information and it becomes impossible to find answers or to find any useful "common denominator" type information.

To overcome the problem of data overload, driver/enabler models have been developed. It is well-established that there are fundamental drivers that are inherent in a business, namely, market, competition, technology, shareholders and government. If a true understanding of these five drivers can be achieved, then it is believed that a complete analysis of a business can be more easily acquired. Thus, it is desirable to monitor these drivers every day, and preferably every second of every day, to really know what is driving a company at any point in time.

Assuming it were possible to gather all that information, it is still difficult to appreciate the significance of the data and to appreciate the context in which all of this data exists. In other words, it is difficult to visualize how the drivers or events, both internal and external, affect a business or any other system.

SUMMARY OF THE INVENTION

Thus there is a need for a method of visualizing data and the interaction of data with different entities within a complex system, such as a business. The present invention provides a visualization method via which it is possible to gain insight into the monitoring, analysis and prediction of the effects of internal and external events.

More specifically, the present invention provides insight into when "drivers" and the timing of driving events affect different entities or functional units of a complex system. In addition, the present invention provides insight into the state or condition of the several entities at the time an event occurs. Further, the present invention provides a method of simulating reactions to drivers and other events.

The foregoing capabilities are made possible by providing a visualization scheme, preferably presented graphically on a computer display, in which a plurality of wheels, each representing a functional unit, entity and/or aspect of a system (such as a business concern), is connected to a virtual communications channel that acts as a common axis for the wheels. The wheels are preferably segmented into several areas that each represent a step in a process. The wheels spin in a predetermined direction around the virtual communications channel, and events and "drivers" are monitored as they travel through the virtual communications channel. At the same time, the state or orientation of the wheels is monitored as the events that travel through the communication channel are captured, whereby it is possible to visually synchronize the event and state of any one or any combination of wheels.

It is therefore an object of the present invention to provide a method of visualizing data.

It is another object of the present invention to provide a method of visualizing the synchronization of events with respect to the state of a process or a particular step in a process.

It is also an object of the present invention to provide a method of visually simulating the transmission of communication through a communications channel and of visually correlating the state of a process when a particular transmission passes a predetermined location.

It is also an object of the present invention to provide a method of visualizing a system by representing functional units of the system with rotating or spinning wheels that rotate or spin around a common axis wherein the common axis represents a communications channel.

It is still another object of the present invention to provide a method of visualizing a predictive model.

These and other objects of the present invention will become apparent upon a reading of the following detailed description in conjunction with the accompanying drawings.

DETAILED DESCRIPTION OF THE INVENTION

The present invention is directed to a method of visualizing data such that it is possible to visualize the collection and timing of internal and external events that occur, for example, in the context of an ongoing business enterprise. To this end, the present invention comprises a method of animating or visualizing the flow of data through a communications channel and of animating or visualizing how that data interacts with a functional unit of a business enterprise and, more particularly, how the cycles of the functional unit coincide or synchronize with the data flow and/or other functional units.

Figure 1:
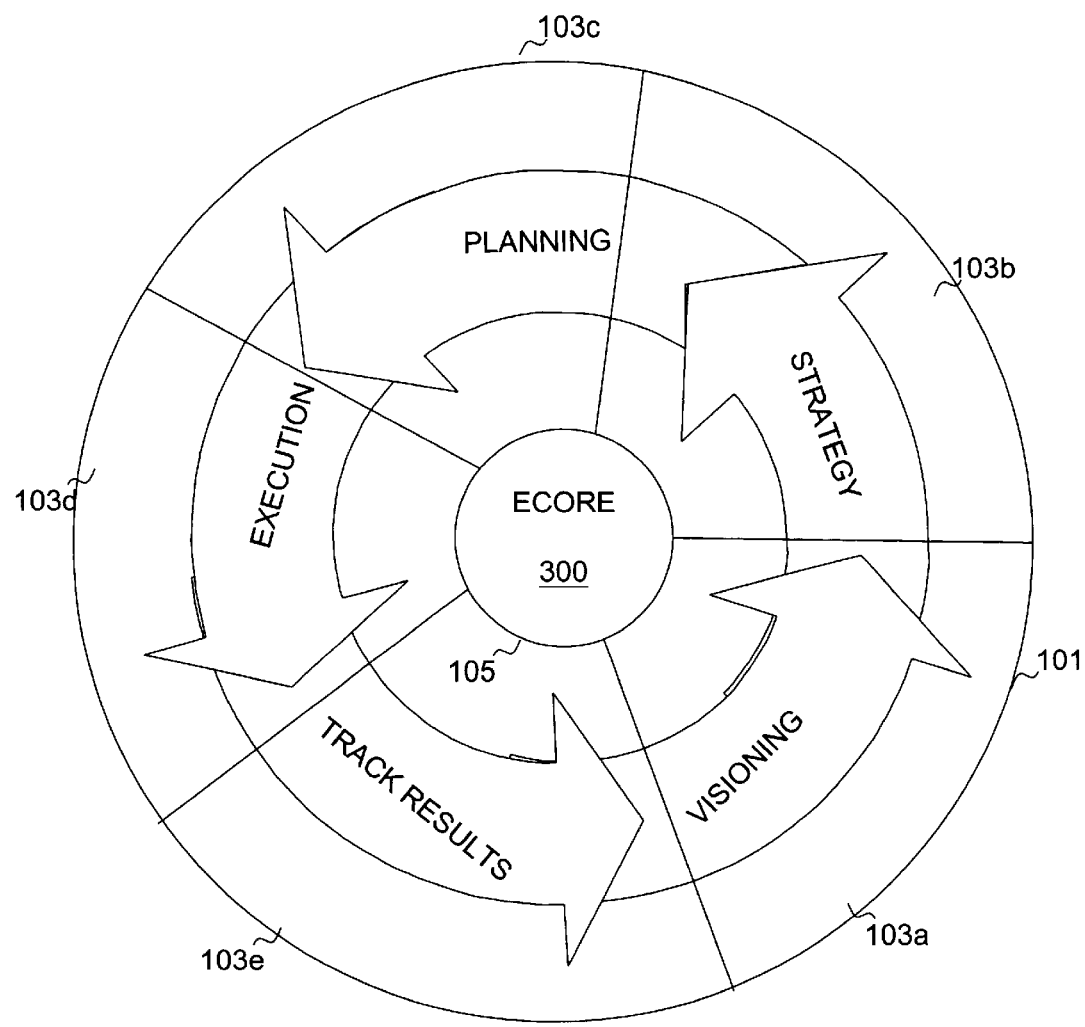
FIG. 1 is a schematic diagram of an exemplary functional unit wheel in accordance with the present invention.

FIG. 1 shows a typical functional unit wheel 101 in accordance with the present invention. Wheel 101 represents a functional unit of an overall system. As used herein, a system is defined as an aggregation of functional units. Thus, a system might include several departments within an organization, individual persons grouped together for a particular purpose, individual persons grouped together for no particular purpose, or companies within an industry. A system in accordance with the present invention might also be several computers connected to each other via a network, or even a collection of biological or chemical entities.

As shown, wheel 101 is preferably broken up into several segments 103a, 103b, 103c, 103d, 103e that each represent a step or steps in a process internal to the functional unit. In the example of FIG. 1, wheel 101 represents the marketing department of a company and is segmented using a well-known business cycle analysis methodology in which a business goal is envisioned, a strategy is designed to promote the vision, planning is undertaken to implement the devised strategy, the plan is executed and results of the execution are tracked to determine if the business goals are being achieved. As businesses tend to be dynamic, the cycle is repetitive and thus begins again with visioning. While there may be some "blurring of lines" between each of segments 103a,.103d, it is usually possible to identify business activities that can be uniquely categorized under one of the segments. Of course, if the functional unit is not related to business, then the wheel segmentation would be different.

Figure 2:
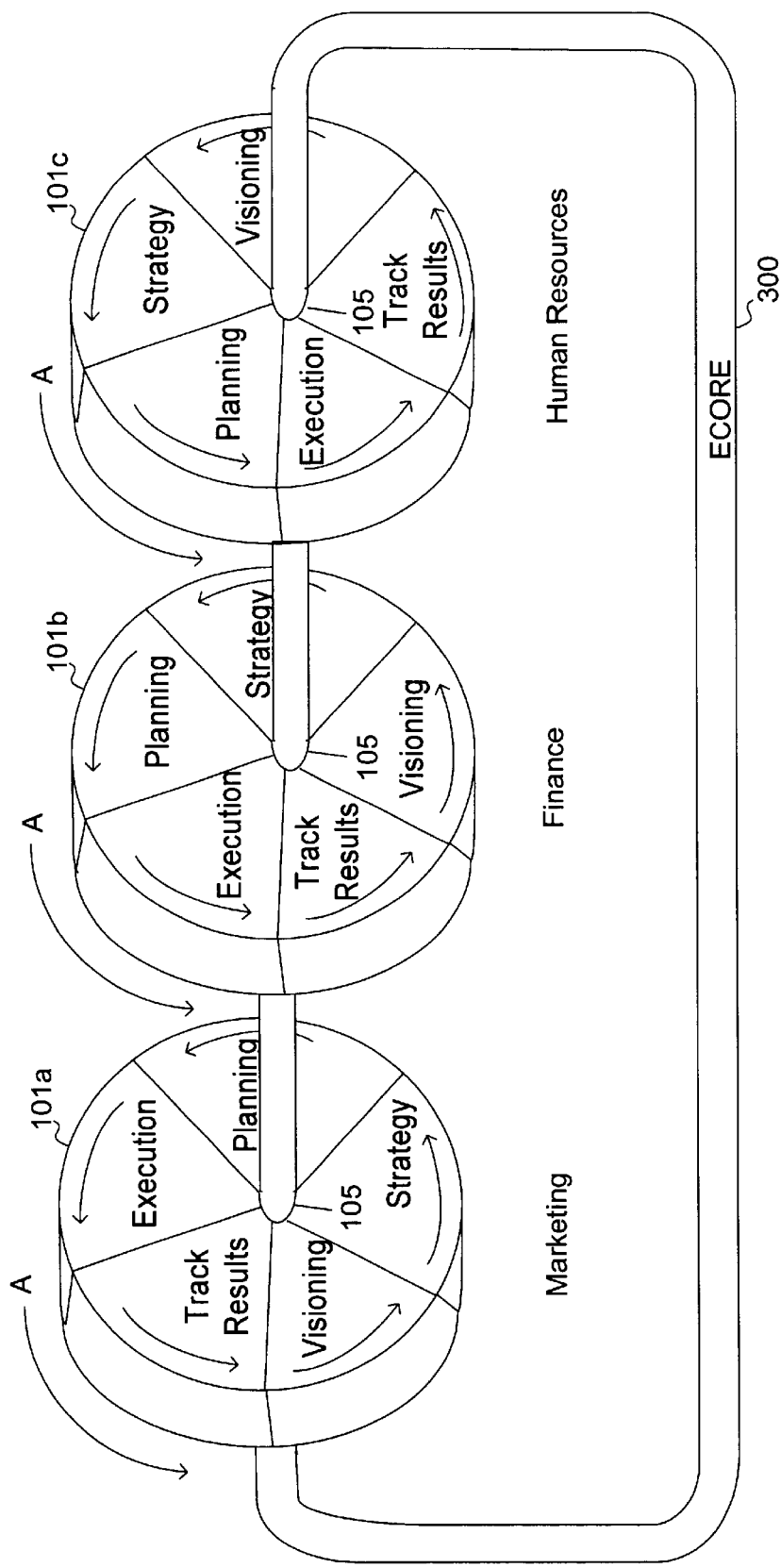
FIG. 2 is a schematic diagram of a plurality of functional unit wheels mounted on a communications channel in accordance with the present invention.

FIG. 2 illustrates how a plurality of functional unit wheels are mounted on or associated with, via a hub 105, an electronic core (ECORE) or communications channel 300. Wheels 101a, 101b and 101c are mounted such that they can be virtually rotated around an axis defined by a longitudinal axis of ECORE 300. In this case, wheel 101a represents a marketing department, wheel 101b represents a financing department and wheel 101c represents a human resources department. Those skilled in the art will appreciate that the foregoing examples of functional units are exemplary in nature only and are not meant to limit the invention in any way. Again, if the system being visualized is not related to business, then the functional units would be different.

In the business world, for example, people and functional units are linked through the information flow represented by ECORE 300. Communication is critical; if business people cannot communicate, there is no interaction and no sales. In other words, entities cannot synchronize without communication. Thus, it is irrelevant how communication occurs as long as it does occur.

When communication does occur between entities or functional units, there is an instant in time when they are linked together (i.e., they are synchronized) and information flows through that linkage. In reality, there are thousands (or even millions) of transactions or linkages that occur (e.g., during the course of a day) over a communications channel 300 like that shown in FIG. 2.

In FIG. 2, ECORE 300 is shown as looping back on itself to represent an endless communication channel, which can be used by any one of the functional units to make contact and/or communicate with any other one of the functional units. However, a non-looped ECORE 300 is also considered within the scope of the instant invention. Functional units associated with a looped ECORE 300 may reap additional benefit from well-known feedback mechanisms, as compared to functional units associated with a non-looped ECORE.

Figure 3:
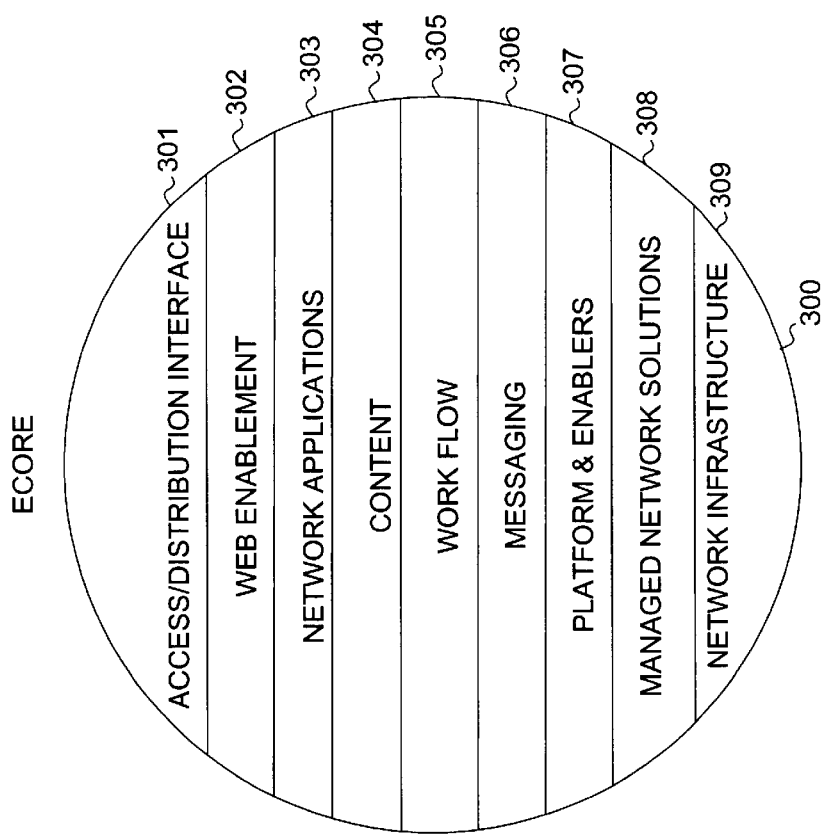
FIG. 3 is a schematic diagram of an exemplary communications channel identified as an electronic core, or "ECORE," in accordance with the present invention.

As shown in FIG. 3, ECORE 300 comprises several possible communication pathways and communication resources that are listed in no particular order. Beginning at the top of FIG. 3, ECORE 300 provides an access/distribution interface 301 such as a computer terminal, internet world wide web enablement 302, network applications 303 such as email, content 304 such as word processing documents and databases, work flow processes 305, messaging capabilities 306 such as instant messaging, platform and enablers 307 such as hardware and software, managed network solutions 308, and network infrastructure 309 such as telecommunication connectivity or even non-electronic versions of communication including face-to-face communication. In other words, ECORE 300, as can be readily understood by the foregoing exemplary components thereof, is intended to comprise all means of communication that might occur between functional units of a system.

The overriding goal of the present invention is to provide insight into the state of the functional units of a system with respect to the timing of internal and external events that are represented as data flowing in ECORE 300. The foregoing is accomplished by animating, showing or visualizing the functional units and their processes, events, and time in accordance with the visualization scheme of the present invention, as depicted in FIG. 2.

More specifically, a computer that includes graphics capabilities is preferably programmed to display each of the elements shown in FIG. 2, for example, and is preferably also programmed to rotate the wheels in the direction shown by arrow A. Of course the rotation direction of any of the wheels can be in an opposite direction than that shown depending on the type of process that is embodied in the particular functional unit that the wheel represents.

That is, though it is assumed that time continues on and that rotation is always progressive and in the same direction, the nature of the model, in accordance with the present invention, does allow for counter rotation to occur. Counter rotation allows visualization of conflict between functions or groupings. For example, there could be a total lack of timing or synchronization with respect to other wheels. Counter-rotation might also be indicative of what is sometimes referred to as the "out of the box " reaction to a driver. Counter-rotation can also indicate violent competition between functions or groupings. The opposing forces can restrict information flow and actually cause binding within a function or group. This is a normal reaction and occurs everywhere, all day, every day. In the context of competition this can be seen in the nature of security around competitive information between competing companies. In such a case, information flow is restricted and there is no alignment between like companies.

The speed of rotation depends on how quickly the internal process of the functional unit occurs. For example, wheel 101a, which represents a marketing department, might spin at a speed representative of one rotation per week. Wheel 101c, which represents a human resources department, on the other hand, might spin more quickly, especially if the visualization scheme of the present invention is used to monitor a period of rapid hiring and/or employee reassignment. The wheels could also spin at a speed on the order of minutes, or even seconds, if the visualization method is used to provide insight into a biological or chemical process.

The advantage of the visualization method according to the present invention will become evident with the following example. Referring again to FIG. 2, assume the visualization method is used to model or analyze Company X, a competitive business having at least marketing, finance and human resources departments. An email is received, via ECORE 300, in the marketing department that reports that Company Y is selling widget Z at 39 cents per box. Assume further that Company X also sells this same product, but at 63 cents per box. In order to stay competitive and win sales, the company must react to this event or driver. Accordingly, an employee in the marketing department might send an email, via ECORE 300, to the finance department requesting information about the true cost to the company for widget Z and inquiring whether there is any room for discounts. The first external event (i.e., the email reporting the lower sales price offered by Company Y), initiates the rotation of wheel 101a. In response, the marketing department of Company X must find a way to compete with Company Y. That is, the marketing department of Company X must run through its internal process by envisioning a solution to its problem (being undercut), coming up with strategy (offer a discount), planning to execute the strategy, actually executing that strategy and then tracking the results.

Of course, Company X's marketing department's activities are not occurring within a vacuum. For example, as already mentioned, there may be a request made to the finance department for information about offering discounts. The finance department, then, in response, follows a similar visioning, strategy, planning execution, track results internal process in its own right. Throughout the internal process for each functional unit (marketing, finance) ECORE 300 is relied upon to transmit and receive information, some of which creates new events and drivers for other functional units (e.g., more salespeople might be desired to "get the word out that" the company is offering discounts, thereby causing the human resources department to initiate an internal process for hiring more people).

Thus, as can be readily appreciated by those skilled in the art, the amount of information and the speed at which this information transits ECORE 300 can be overwhelming. However, by capturing discrete events (e.g., emails, messages, content, web search strings, discussion threads, "chat room" discussions, etc.) as they transit ECORE 300, it is possible to begin to populate databases with information related to each of the functional units. The timing of these events can then be synchronized, visually, with the rotating wheels that represent the functional units of the overall system (business, etc.). In so doing, it is possible to visually correlate the timing of internal and external events with the state (or rotational position) of an internal process associated with a functional unit of the system. One can then also visually appreciate the state of internal processes with respect to each other in addition to state of any one functional unit with respect to the timing of an event. This visual information can then be used to find inefficiencies within an organization and help to provide solutions to various problems, such as communication problems, sales problems, reaction times, etc.

The present invention can also be used as a visual simulator or visual predictive model. After accumulating sufficient data, which can be indexed or stored in a chronological fashion using well-known computer relational database techniques, ECORE 300 is monitored in real time and well-known pattern matching techniques are applied to the stored data to find a pattern that most closely matches real time events and wheel rotation. Assuming a match is found, the displayed wheels can be sped up to "look into" the future or predict where the wheels should or will be. In other words, it is possible to visualize how internal processes might unfold in view of preciously stored patterns.

Thus, the method of the present invention provides a three-dimensional visualization technique by which it is possible to "watch" the functional units of systems react to and process information and to synchronize with each other. Likewise, the present invention permits a user to "peer" into the future to the extent data is available to detect patterns that occur in real time and match those patterns with previously-stored data.

The foregoing disclosure of the preferred embodiments of the present invention has been presented for purposes of illustration and description. It is not intended to be exhaustive or to limit the invention to the precise forms disclosed. Many variations and modifications of the embodiments described herein will be obvious to one of ordinary skill in the art in light of the above disclosure. The scope of the invention is to be defined only by the claims appended hereto, and by their equivalents.

Further, in describing representative embodiments of the present invention, the specification may have presented the method and/or process of the present invention as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process of the present invention should not be limited to the performance of their steps in the order written, and one skilled in the art can readily appreciate that the sequences may be varied and still remain within the spirit and scope of the present invention.

What is claimed is:

1. A method of visualizing data, comprising the steps of:
   (a) designating a plurality of wheels each representing a functional unit of a system, wherein each wheel is subdivided into segments collectively representing a process within the functional unit of the system;
   (b) identifying at least one communications pathway;
   (c) connecting a hub of each of the wheels through the communications pathway;
   (d) rotating the wheels around the communication pathway;
   (e) periodically noting rotational positions of the plurality of wheels; and
   (f) correlating the rotational positions with timing of information that is transmitted via the communications pathway.

2. The method of claim 1, wherein the system is a business.

3. The method of claim 1, wherein the system is an aggregate of functional units.

4. The method of claim 1, wherein the functional unit is a division or department of a business.

5. The method of claim 1, wherein the communications pathway is at least one of an access/distribution interface, an internet world wide web enablement system, a network application, content, a work flow process, messaging, platform and enablers, managed network solutions and network infrastructure.

6. The method of claim 1, wherein the wheels rotate in the same direction.

7. The method of claim 1, wherein the wheels rotate in different directions.

8. The method of claim 1, wherein the step of correlating comprises the step of synchronizing.

9. A method of visualizing activity within a system, comprising the steps of:
- (a) monitoring a communications pathway for data indicative of an event;
- (b) providing a graphical displayed wheel, the wheel representing a functional unit of the system and being subdivided into segments collectively representing a process within the functional unit of the system;
- (c) rotating the wheel around the communications pathway at a speed consistent with a speed at which the process within the functional unit is occurring, wherein the communications pathway is arranged to pass through a hub of the wheel; and
- (d) determining the rotational position of the wheel at a time of the event.

10. The method of claim 9, wherein the system is a business.

11. The method of claim 9, wherein the system is an aggregate of functional units.

12. The method of claim 9, wherein the functional unit is a division or department of a business.

13. The method of claim 9, wherein the communications pathway is at least one of an access/distribution interface, an internet world wide web enablement system, a network application, content, a work flow process, messaging, platform and enablers, managed network solutions and network infrastructure.

14. The method of claim 9, wherein the wheel rotates in a direction dictated by the process.

15. The method of claim 9, further comprising providing a plurality of graphically displayed wheels.

16. The method of claim 15, wherein at least two of the wheels rotate in different directions.

17. A method of predicting using a visual model, comprising the steps of:
- (a) monitoring a communications pathway for data indicative of events;
- (b) recording the state of internal processes, respectively associated with functional units of a system, at the time of the events;
- (c) storing a plurality of events and corresponding states;
- (d) providing a plurality of graphically displayed wheels, each wheel representing one of the functional units of the system and each wheel being subdivided into segments collectively representing the internal process within the functional unit of the system, wherein the state of a wheel is determined by its rotational position;
- (e) monitoring the communications pathway in real time;
- (f) matching real time patterns of events and system states with stored events and corresponding states; and
- (g) rotating the wheels to positions corresponding to a previously stored event and corresponding state, wherein the communications pathway passes through respective hubs of the wheels.

18. The method of claim 17, wherein the system is a business.

19. The method of claim 17, wherein the system is an aggregate of functional units.

20. The method of claim 17, wherein the functional unit is a division or department of a business.

21. The method of claim 17, wherein the communications pathway is at least one of an access/distribution interface, an internet world wide web enablement system, a network application, content, a work flow process, messaging, platform and enablers, managed network solutions and network infrastructure.

22. The method of claim 17, wherein the wheels rotate in a direction dictated by the processes.

23. The method of claim 17, wherein at least two of the wheels rotate in different directions.

24. A graphical user interface, comprising:
- an elongated core subdivided, in cross-section, into a plurality of sectors, each sector representing a communications pathway;
- a first wheel having a hub having a size such that the first wheel is rotatively coupled to the elongated core, the first wheel being representative of a first functional unit of a system and the first wheel being subdivided into segments collectively representing a process within the first functional unit of the system; and
- a second wheel having a hub having a size such that the second wheel is rotatively coupled to the elongated core, the second wheel being representative of a second functional unit of the system and the second wheel being subdivided into segments collectively representing a process within the second functional unit of the system,
- wherein the first and second wheels are rotated around the elongated core to simulate performance of the first and second processes, respectively.

25. The graphical user interface of claim 24, wherein the system is a business.

26. The graphical user interface of claim 24, wherein the system is an aggregate of the first and second functional units.

27. The graphical user interface of claim 24, wherein the first and second functional units are divisions or departments of a business.

28. The graphical user interface of claim 24, wherein each communications pathway is at least one of an access/distribution interface, an internet world wide web enablement system, a network application, content, a work flow process, messaging, platform and enablers, managed network solutions and network infrastructure.

29. The graphical user interface of claim 24, wherein the first and second wheels rotate in the same direction.

30. The graphical user interface of claim 24, wherein the first and second wheels rotate in different directions.

* * * * *